United States Patent
Singh et al.

(10) Patent No.: US 11,113,034 B2
(45) Date of Patent: Sep. 7, 2021

(54) SMART PROGRAMMING ASSISTANT

(71) Applicant: EMC IP Holding Company LLC, Hopkinton, MA (US)

(72) Inventors: Yash Kumar Singh, New Delhi (IN); Ayush Joshi, Uttar Pradesh (IN); Abhishek Dutta, Jharkhand (IN); Maunica Naga Kolla, Hyderabad (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 16/668,922

(22) Filed: Oct. 30, 2019

(65) Prior Publication Data
US 2021/0132913 A1    May 6, 2021

(51) Int. Cl.
| | |
|---|---|
| *G06F 9/44* | (2018.01) |
| *G06F 8/33* | (2018.01) |
| *G06F 16/958* | (2019.01) |
| *G06F 8/34* | (2018.01) |
| *G06F 3/0482* | (2013.01) |
| *G06F 11/30* | (2006.01) |

(Continued)

(52) U.S. Cl.
CPC .............. *G06F 8/33* (2013.01); *G06F 3/0482* (2013.01); *G06F 8/34* (2013.01); *G06F 8/77* (2013.01); *G06F 11/302* (2013.01); *G06F 11/3438* (2013.01); *G06F 16/972* (2019.01)

(58) Field of Classification Search
CPC . G06F 3/0482; G06F 8/33; G06F 8/34; G06F 8/77; G06F 11/302; G06F 11/3438; G06F 16/972

USPC ................................................. 717/106–119
See application file for complete search history.

(56) References Cited

U.S. PATENT DOCUMENTS

| | | | | |
|---|---|---|---|---|
| 8,060,857 B2* | 11/2011 | Biggerstaff | ............. | G06F 8/456 |
| | | | | 717/106 |
| 9,519,464 B2* | 12/2016 | Dang | ......................... | G06F 8/33 |

(Continued)

OTHER PUBLICATIONS

Angus et al., "NLP2Code: Code Snippet Content Assist via Natural Language Tasks", 2017, IEEE, pp. 628-632. (Year: 2017).*

(Continued)

*Primary Examiner* — Ted T. Vo
(74) *Attorney, Agent, or Firm* — Ryan, Mason & Lewis, LLP

(57) ABSTRACT

Methods, apparatus, and processor-readable storage media for providing a smart programming assistant are provided herein. An example computer-implemented method includes monitoring user input being provided to an application by a user; identifying a context of the user input relative to a given computer programming language; obtaining one or more candidate code completion suggestions that match the identified context, and information aggregated from a plurality of web sources that is linked to at least a given one of the candidate code completion suggestions, wherein the information comprises programming language documentation information and code samples; and outputting a ranked list of the candidate code completion suggestions and at least a portion of the obtained information to a graphical user interface associated with the application in real time, wherein the order of the ranked list is based at least in part on one or more characteristics associated with the user.

20 Claims, 8 Drawing Sheets

(51) Int. Cl.
*G06F 11/34* (2006.01)
*G06F 8/77* (2018.01)

(56) References Cited

U.S. PATENT DOCUMENTS

| | | | |
|---|---|---|---|
| 10,776,082 B2* | 9/2020 | Dey | G06F 40/30 |
| 2014/0109042 A1* | 4/2014 | Christensen | G06F 8/34 |
| | | | 717/109 |
| 2016/0357519 A1* | 12/2016 | Vargas | G06F 9/451 |
| 2020/0097261 A1* | 3/2020 | Smith | G06N 3/0454 |

OTHER PUBLICATIONS

Ponzanelli et al., "Seahawk: Stack Overflow in the IDE", 2013, IEEE, pp. 1295-1298 (Year: 2013).*

Wightman et al., "SnipMatch: Using Source Code Context to Enhance Snippet Retrieval and Parameterization", 2012, ACM, 10 pages (Year: 2012).*

Kite announces Intelligent Snippets for Python, retrieved from https://kite.com/blog/product/announcing-intelligent-snippets-for-python/ on Sep. 5, 2019.

* cited by examiner

SMART PROGRAMMING ASSISTANT

FIELD

The field relates generally to information processing systems, and more particularly to techniques for providing real time programming assistance in such systems.

BACKGROUND

Typically, developers spend large amounts of time searching for information related to functions and code samples, such as information related to arguments of a specific function or application programming interface (API) usage. Switching back and forth between a browser to search for this information and an integrated development environment (IDE) interrupts the flow of programming, thereby decreasing the developer's productivity. Further, different corporate or enterprise settings have different coding practices implemented in their systems, which leads to inconsistencies and inefficiencies when onboarding new developers.

SUMMARY

Illustrative embodiments of the invention provide techniques for providing a smart programming assistant. An exemplary computer-implemented method can include monitoring user input being provided to an application by a user, the user input associated with developing software code in one or more computer programming languages; identifying a context of the user input relative to the one or more computer programming languages; obtaining, from a storage system, one or more candidate code completion suggestions that match the identified context, and information aggregated from a plurality of web sources that is linked to at least a given one of the candidate code completion suggestions, wherein the information comprises programming language documentation information and one or more code samples; and outputting, in response to the user input, a ranked list of the one or more candidate code completion suggestions and at least a portion of the obtained information to a graphical user interface associated with the application in real time, wherein the order of the ranked list is based at least in part on one or more characteristics associated with the user.

Illustrative embodiments can provide significant advantages relative to conventional development tools. For example, challenges associated with frequently switching contexts to find information relevant to a code component of a programming language are overcome through providing ranked code completions, context aware language documentations, and specific code samples from both internal and external sources in real time and without having to leave the IDE/code editor context.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1A:
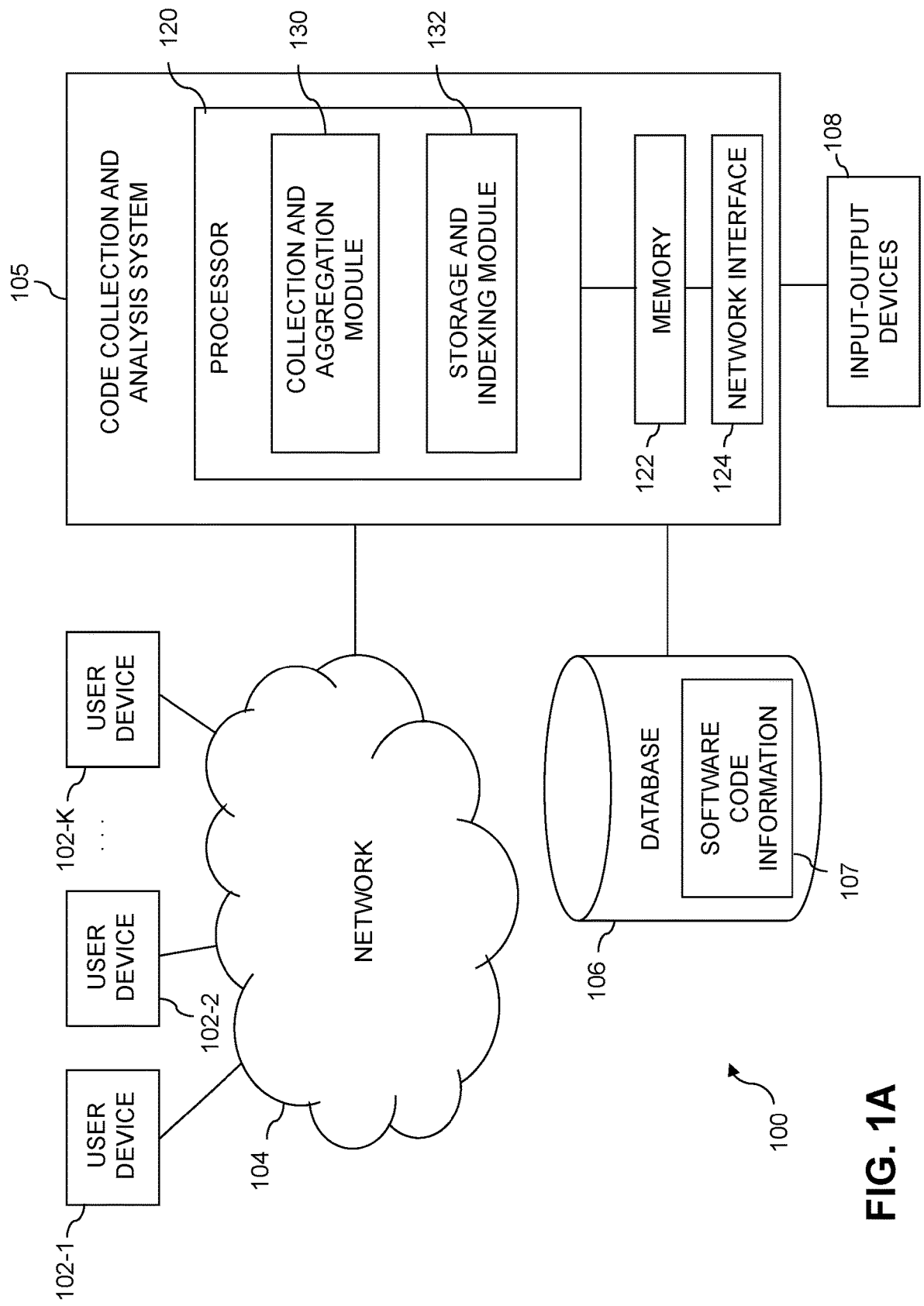
FIGS. 1A and 1B show an information processing system configured for providing real time programming assistance in an illustrative embodiment of the invention.
Figure 1B:
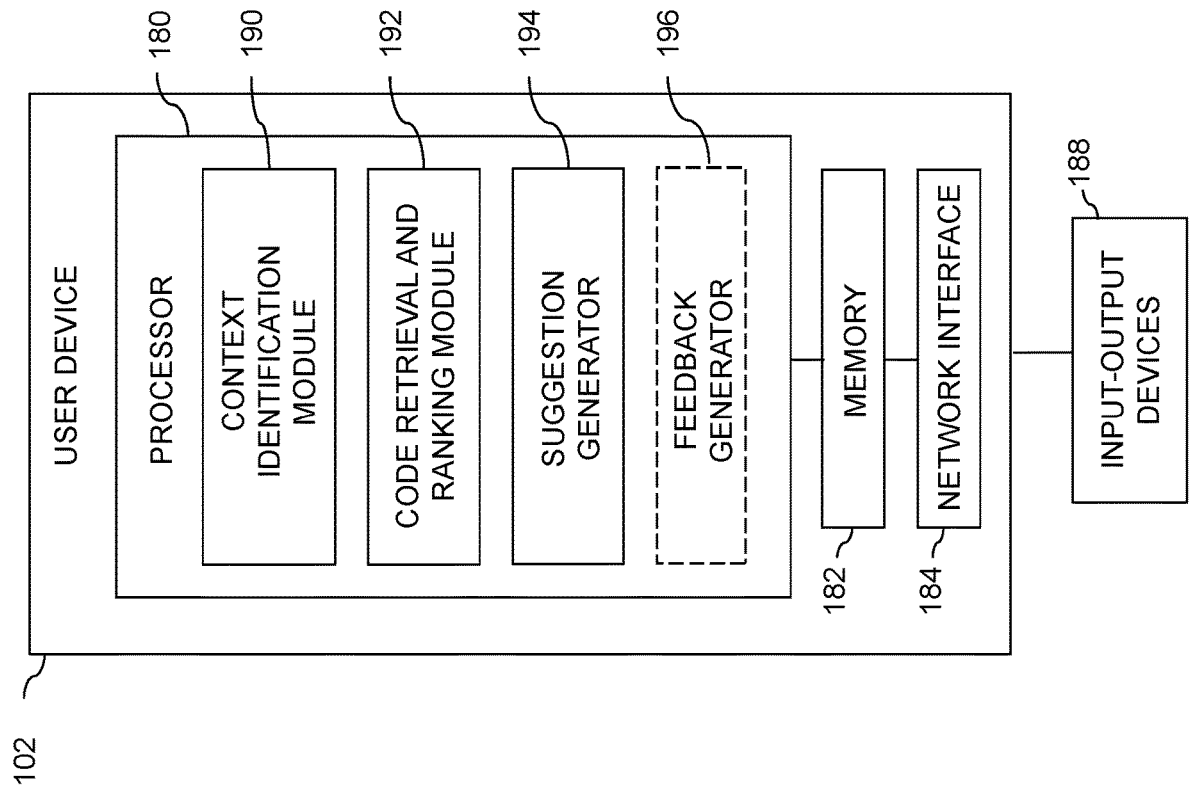

FIGS. 1A and 1B (collectively referred to herein as FIG. 1) show a computer network (also referred to herein as an information processing system) 100 configured in accordance with an illustrative embodiment of the invention. In this example, the computer network 100 comprises a plurality of user devices 102-1, 102-2, . . . 102-K, collectively referred to herein as user devices 102 coupled to a network 104. An example embodiment of one of the user devices 102 is shown in further detail in FIG. 1B. Also coupled to network 104 is a code collection and analysis system 105.

The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the code collection and analysis system 105 can have an associated database 106 configured to store data 107 pertaining to software code information, which comprise, for example, indexed software code information such as information corresponding to one or more software code samples (or snippets) and information related to software code documentation, for example.

The database 106 in some embodiments is implemented using one or more storage systems associated with the code collection and analysis system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 and the code collection and analysis system 105 are input-output devices 108 and 188, which illustratively comprise keyboards, displays or other types of input-output devices in any combination. Such input-output devices can be used, for example, to support one or more user interfaces to user devices 102 and the code collection and analysis system 105, as well as to support communication between user devices 102, the code collection and analysis system 105, and/or other related systems and devices not explicitly shown.

Each user device 102 and the code collection and analysis system 105 in the FIG. 1 embodiment is assumed to be implemented using at least one processing device. Each such processing device generally comprises at least one processor and an associated memory, and implements one or more functional modules for controlling certain features of the user device 102 and the code collection and analysis system 105.

More particularly, the code collection and analysis system 105 in this embodiment can comprise a processor 120 coupled to a memory 122 and a network interface 124. Each user device 102 in this embodiment can comprise a processor 180 coupled to a memory 182 and a network interface 184.

The processors 120, 180 illustratively comprise a microprocessor, a microcontroller, an application-specific integrated circuit (ASIC), a field-programmable gate array (FPGA) or other type of processing circuitry, as well as portions or combinations of such circuitry elements.

The memories 122, 182 illustratively comprise random access memory (RAM), read-only memory (ROM) or other types of memory, in any combination. The memories 122, 182 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the code collection and analysis system 105 to communicate over the network 104 with, for example, the user devices 102. Similarly, the network interface 184 allows the user devices 102 to communicate over the network 104 with, for example, the other user devices 102 and/or the code collection and analysis system 105. The network interfaces 124, 184 illustratively comprise one or more conventional transceivers.

The processor 120 of the code collection and analysis system 105 comprises a collection and aggregation module 130 and a storage and indexing module 132. The processor 180 of each user device 102 may include a context identification module 190, a code retrieval module 192, a suggestion generator module 194, and, optionally, a feedback generator 196.

It is to be appreciated that this particular arrangement of modules 130, 132 illustrated in the processor 120 of the FIG. 1 embodiment is presented by way of example only, and alternative arrangements can be used in other embodiments. For example, the functionality associated with the modules 130 and 132 in other embodiments can be combined into a single module, or separated across a larger number of modules. As another example, multiple distinct processors can be used to implement different ones of the modules 130 and 132 or portions thereof.

At least portions of the collection and the aggregation module 130 and the storage and indexing module 132 may be implemented at least in part in the form of software that is stored in memory 122 and executed by processor 120.

Similarly, it is to be appreciated that that this particular arrangement of modules 190, 192, 194, and 196 illustrated in the processor 180 of the FIG. 1 embodiment is presented by way of example only, and alternative arrangements can be used in other embodiments. For example, the functionality associated with the modules 190, 192, 194, and 196 in other embodiments can be combined into a single module, or separated across a larger number of modules. As another example, multiple distinct processors can be used to implement different ones of the modules 190, 192, 194, and 196 or portions thereof.

At least portions of the context identification module 190, the code retrieval module 192, the suggestion generator module 194, and, optionally, the feedback generator 196 may be implemented at least in part in the form of software that is stored in memory 182 and executed by processor 180.

It is to be understood that the particular set of elements shown in FIG. 1 for providing a smart programming assistant involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, the FIG. 1 embodiment shows the user devices 102 and the code collection and analysis system 105 as separate entities, however, in at least one embodiment the functionality associated with all of the modules 130, 132, 190, 192, 194, and 196 may be implemented by a single one of these entities (e.g., the code collection and analysis system 105).

An exemplary process utilizing collection and aggregation module 130 and storage aggregation module 132 of an example code collection and analysis system 105 in computer network 100 will be described in more detail with reference to the flow diagram of FIG. 4. An exemplary process utilizing the context identification module 190, the code retrieval module 192, the suggestion generator module 194, and, optionally, the feedback generator 196 of an example user device 102 in computer network 100 will be described in more detail with reference to the flow diagram of FIG. 5.

Accordingly, at least one embodiment of the invention includes providing an artificial intelligence based virtual programming assistant. For example, the virtual programming assistant may provide ranked code completions and context aware language documentation to a user via a user interface. Additionally, specific code samples from various sources may be provided in real time within the same context, for example, alongside the user's IDE or code editor. The virtual programming assistant supports internal sources (e.g., private code repositories or documentation of a user's organization) and/or external sources (such as, for example, Stack Overflow® and GitHub®). It also can work across different programming languages and IDEs/code editors. This developer tool may assist new developers in learning coding practices and technologies of, for example, a particular company thus greatly reducing the typical onboarding efforts. One or more example embodiments are trained to particular business contexts using machine learning (ML) techniques (e.g., for Tech Support Systems, Sales, etc.).

Figure 2:
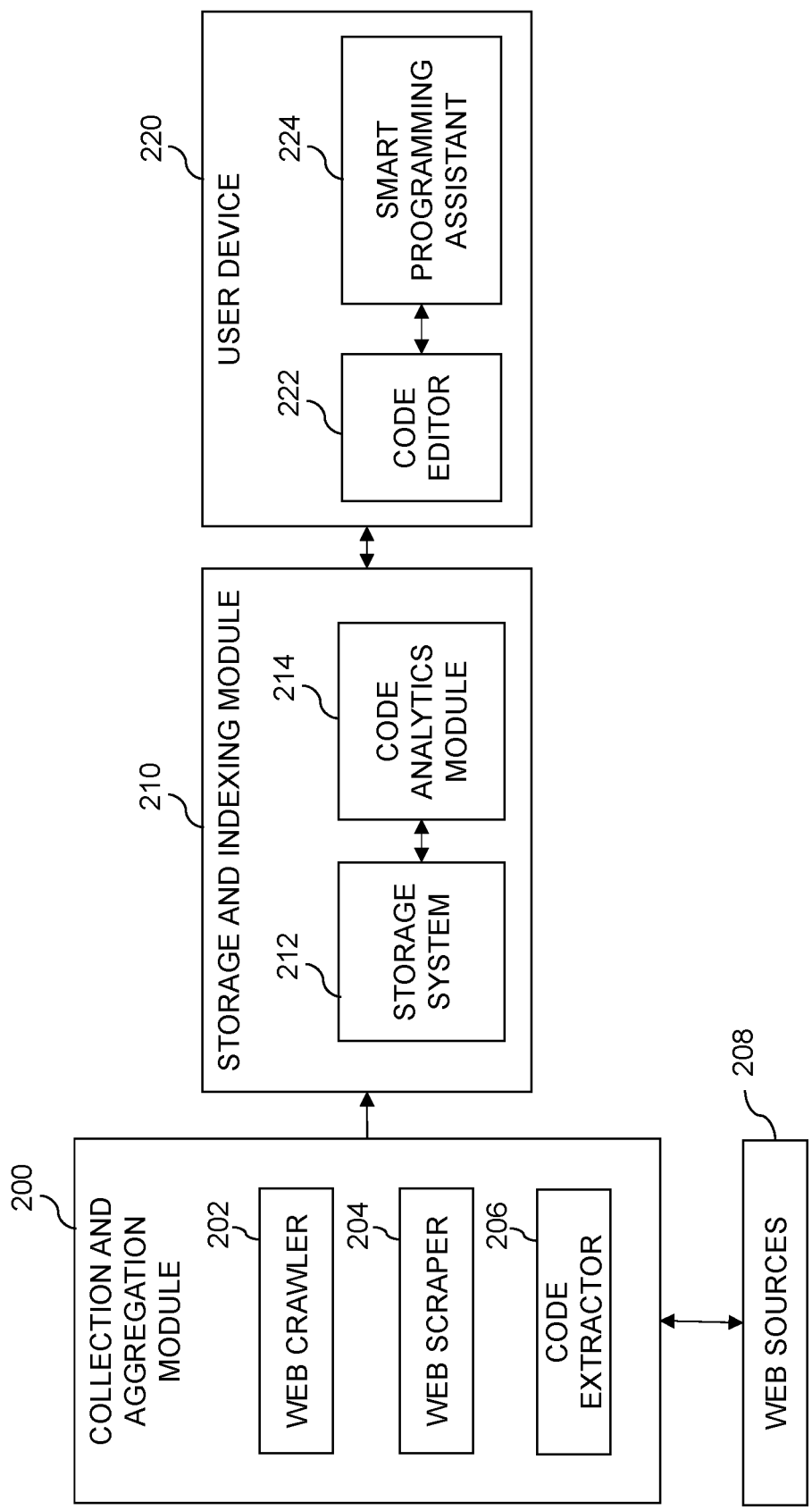
FIG. 2 shows an example of a system architecture according to an illustrative embodiment.

FIG. 2 shows an example of a system architecture according to an illustrative embodiment. In this example, the system architecture includes a collection and aggregation module 200, a storage and indexing module 210, and a user device 220. As a non-limiting example, the user device 220 may correspond to one of the user devices 102, and the collection and aggregation module 200 and storage and indexing module 210 may correspond to modules 130 and 132 of code collection and analysis system 105, respectively.

The collection and aggregation module 200 in this example includes a web crawler 202, a web scraper 204, and a code extractor 206. The web crawler 204 crawls one or more of the web sources 208 (or portions thereof) to obtain code sources and documentation data based on a starting address. The web sources 208 may include language specific web documents and may be added or subtracted on an as-needed basis. The web crawler 202 helps identify target spots for extracting data including documentations or code samples (e.g., given within the official documentations) from the web sources 208.

The web scraper 204 scrapes the sources and links that were identified by the web crawler 202. Documentations extracted from the web sources 208 are segmented into code-level subdivisions (e.g., classes, functions, constants, etc.) for indexed storage and faster information retrieval. Code samples are tagged based on the markers in the documentation (e.g., Web Development or UI Development).

By way of example, the web crawler 202 may be configured to perform the following steps:
1. Initiate a crawl of an online source given a starting address of a documentation page (e.g., an official documentation page); and
2. Traverse each page link-by-link to identify targets to be extracted while storing the targets in a tree type structure.

The web scrapper 204 may then be configured to perform the following steps:
1. Obtain the tree structure of identified targets from the web crawler;
2. Target HTML tags for relevant content;
3. Create a file for a given parent node in the tree structure (where the parent node corresponds to one of the classes defined by the online source);
4. Extract tag information for the given parent node and store the information as key-value pairs in the created file corresponding to the given parent node;
5. Extract and collate data related to each child node of the given parent node, and store the data in the same file of the given parent node while maintaining the hierarchy; and
6. Iteratively repeat steps 3-5 for all parent nodes in the tree structure.

The code extractor 206 extracts code samples from one or more web sources 208, wherein each of the web sources 208 correspond to external sources or internal sources (e.g., private code repositories). In at least one example embodiment, the code extractor 206 extracts the data using publicly available APIs. For example, answers for web sources (such as Stack Overflow®, for example) may be extracted along with flags from badged/up-voted sources, and the code samples may be stored in a flat file format based on a corresponding language flag. As another example, the code extractor 206 may be configured to identify relevant code repositories for web sources (such as GitHub®, for example), using a web crawler (such as web crawler 202). A public API may then be used to fetch the data corresponding to the identified code repositories. Tags and identifiers are used to group the source codes. Private sources (such as a TFS (Team Foundation Server) source, for example) may be extracted using private APIs to gather internal code samples, which may be logically grouped based on, for example, inline comments.

The operations performed by the collection and aggregation module 200 may be one-time processes for fetching the documentations as well as code samples, or may be repeated on a schedule depending on how frequently libraries or functionalities are being released for a particular language from a given source. For example, the processes could be executed as a batch job and be triggered on a periodic basis (e.g., every 3 months) to fetch the newest code specifications as well as solutions.

The data extracted by the collection and aggregation module 200 are sent to the storage and indexing module 210, which includes a storage system 212 component and code analytics module 214. The storage system 212 identifies the data that correspond to code documentation and transforms it into logically segmented key value pairs, wherein each library class is stored in a separate file (e.g., a JSON file) that includes all relevant code components (e.g., functions, constants, constructors, etc.). The storage system 212 may extract all of the documentation data from the files created by the collection and aggregation module 200, assign uniform key names to code components in the extracted documentation data irrespective of the programming language, and upload the documentation to an unstructured database.

Additionally, the storage system 212 collects the data extracted by the collection and aggregation module 200 that correspond to code samples and analyzes the code samples for the code components (e.g., classes and functions) that are used in the code samples. To accomplish this, the storage system 212 may perform a language segmentation process for code samples across all sources, and then perform a context segmentation process based on any relevant tags that are available. The code components may then be identified by partially parsing the code samples to generate a context map. Code samples are linked to respective class files stored in the unstructured database, for example, with an appropriate, descriptive key, wherein the code sample is the value corresponding to the key.

Additionally, associations are tagged with keywords, tags, and/or flags that were obtained from the collection and aggregation module 200. These associations may refer to context maps that are generated for the respective code samples upon code analysis. The context maps are used to identify and retrieve the code samples. As an example, if code sample A includes class B in its code, then an association is generated to class B, wherein code sample A is retrieved along with documentation information for class B. This association is then tagged with a tag for library C, such that library C invokes this association and retrieves relevant documentation information and/or code samples for class B and code sample A.

As and when the data collection jobs are run by the collection and aggregation module 200, the code documentation and code sample data is re-fortified based on the above.

The storage and indexing module 210 also includes code analytics module 214. For each set of categorically divided libraries, classes and functions, the code analytics module 214 carries out operations based on, for example, term frequency-inverse document frequency (TF-IDF) and PageRank algorithms, in order to rank each of the code components (e.g., libraries, classes, and functions). The suggestions provided to the user device 220 will then be weighed according to this ranking.

Additionally, the code analytics module 214 may learn user-specific ranking for the code components using one or more ML techniques. For example, the storage system 212 may include a personalized data store that is configured to store data for individual users, where a user document object is created for each user for storing feedback information. The feedback information may include, for example, a user's most typed classes, favorite functions, and/or other statistics related to the use of smart programming assistant 224 by the user. The feedback information is provided as input to a ML model of the code analytics module 214, which generates a score (e.g., a popularity score) for one or more code components for the individual user. This score may be included in an API response from the storage and indexing module 210 to the user device 220 to customize the order that suggestions are displayed to the user in the smart programming assistant 224.

The storage and indexing module 210 also obtains information regarding the languages, classes, functions, and libraries that each piece of documentation pertains to, from the collection and aggregation module 200. These documents are tagged as suggestions for a specific context, for example, with a context signature. When a request from the smart programming assistant 224 matches one of the context signatures, then the corresponding documentations will be provided (e.g., displayed via a graphical user interface) to the user device 220.

The code analytics module 214 analyzes the code samples via, for example, static code analysis and/or runtime code analysis to rank each of the code samples based on one or more metrics. The metrics may include quality metrics pertaining to degree in which a given code sample complies with best coding practices, an execution time associated with the given code sample, and security risks associated with the given code sample, for example.

The code samples are provided to the user device 220 based on their development context and the quality of code samples available. In at least one example embodiment, the storage and indexing module 210 learns to identify higher quality replacements over time to replace existing code samples suggested to the user (e.g., as determined by the metrics).

The storage system 212 facilitates real time retrieval of relevant stored data for the smart programming assistant 224 of the user device 220. For this purpose, the documents may be stored in a data set instance (such as, a replica data set instance), such that the documents are indexed by class name and function name. The documents may then be uploaded to a distributed search engine instance, using a data replication module. The data replication module may, for example, create a pipeline that synchronizes data between the replica dataset instance and the distributed search engine instance. The retrieval of data by the storage system 212 is facilitated by creating custom indexes that specify data types and properties for each of the key value pairs that were linked in the data that is stored within the distributed search engine. The distributed search engine then communicates with the user device 220 via an API gateway to provide real time data retrieval capability.

In the example shown in FIG. 2, the user device 220 includes a code editor 222 application (or an IDE) and a smart programming assistant 224. The smart programming assistant 224 in this example is a desktop application that sits next to the code editor 222 and provides the context aware code suggestions and documentations within the coding context to reduce productivity loss of the user. In at least one embodiment, the smart programming assistant 224 regularly makes use of representational state transfer (REST) web service calls to an API Gateway for fetching real time suggestions from the storage and indexing module 210.

In at least one example embodiment, the smart programming assistant 224 includes a back-feed logging mechanism per session for each user. This mechanism may be used to gather personal code documentation and/or code sample favorites (e.g., by monitoring user statistics). The back-feed logging mechanism may be implemented, at least in part, using a logging framework to gather such information. This information may be used as input to the ML model of code analytics module 214 to refine suggestions for each user over time.

In at least one example embodiment, the smart programming assistant 224 uses an API gateway to communicate with storage and indexing module 210. In one example, the API gateway is based on an application framework (e.g., an open source application framework) that is installed as a middleware to appropriately respond to each of the data requests that are generated by the smart programming assistant 224. The API gateway is designed in a microservice fashion which splits functionalities into smaller individual services, thus minimizing failure. This type of component (not shown in FIG. 2) may reside in a cloud infrastructure separate from the user device 220.

In the example shown in FIG. 2, it is assumed that the smart programming assistant 224 communicates with the code editor using a plugin (e.g., a PIPE plugin). For example, the plugin is configured to identify the IDE processes from the process identifiers (i.e., Process IDs) in the running tasks of user device 220. The plugin then captures keystrokes of the user on this active window and relays the keystrokes to the smart programming assistant 224 for pre-processing. The keystroke data typically corresponds to user activity from a keyboard device; however, it is to be appreciated that the keystroke data may also encompass other user interface activity from non-keyboard devices such as, for example, mouse clicks, transcribed voice commands, etc.

The pre-processing includes creating a data structure line-by-line from the written code (as determined from the keystroke data). This data structure is then parsed to identify common coding reserved keywords which are then distinguished from custom variables through a parser. The identified code component (e.g., class or function) keywords are sent to the API gateway for fetching suggestions from the storage system 212.

Also, the smart programming assistant 224 may include monitoring and logging user statistics corresponding to how code completion suggestions are used. Such statistics may then be used to customize the user experience of the smart programming assistant 224.

Figure 3:
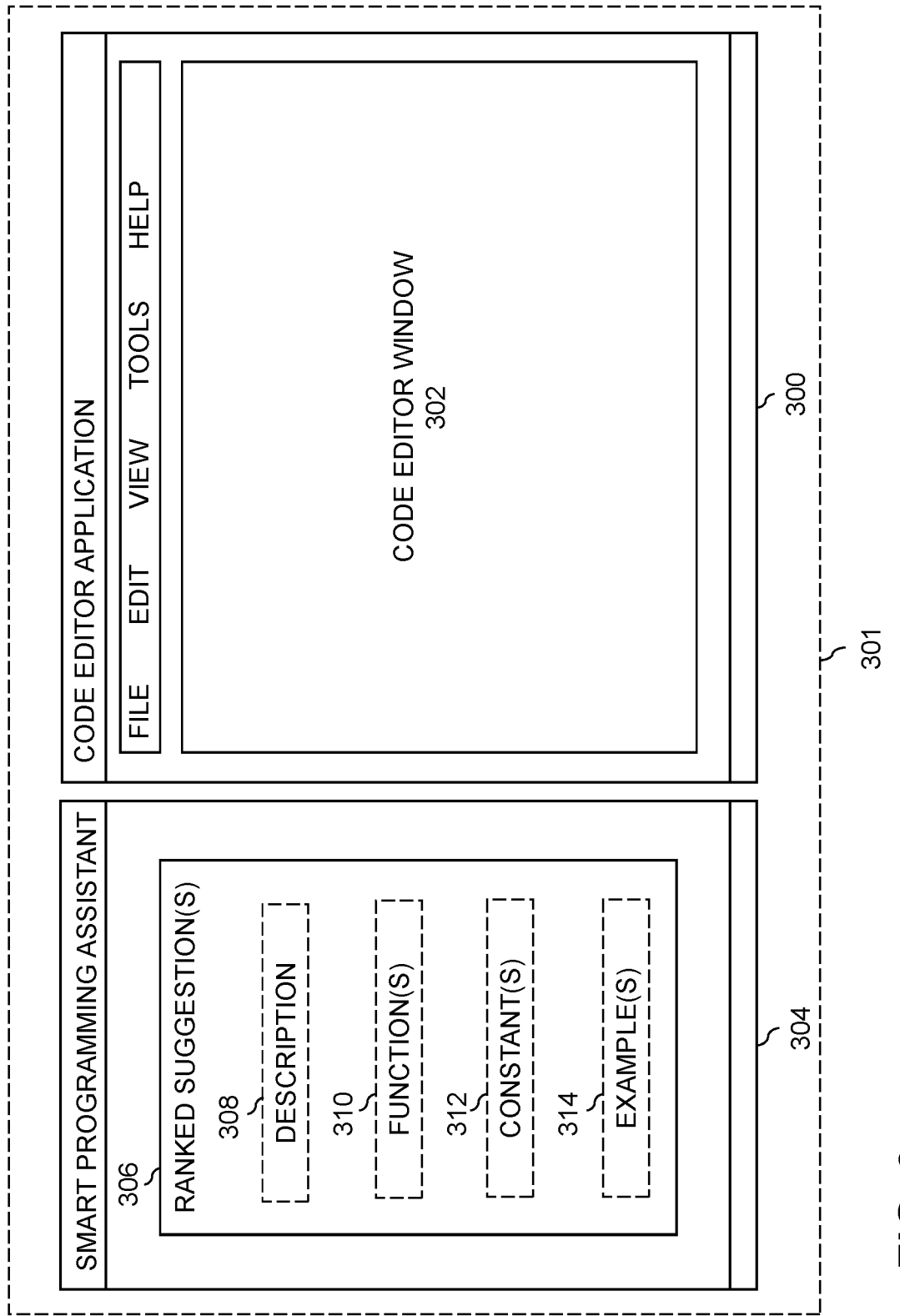
FIG. 3 shows an example of a graphical user interface in accordance with exemplary embodiments.

Referring also to FIG. 3, this figure shows an example of a graphical user interface (GUI) in accordance with exemplary embodiments. In this example, a GUI corresponding to a smart programing assistant 304 is displayed alongside a GUI of a code editor application 300. The GUIs 300, 304 are displayed within a desktop or display of a user device, for example, as represented by block 301. The GUI 300 depicted in FIG. 3 may correspond to an IDE/code editor application 222, and the GUI 304 may correspond to the smart programming assistant 224.

The GUI 300 includes a code editor window 302, wherein a user enters text (e.g., corresponding to programming code) corresponding to a particular programming language. The smart programming assistant generates one or more ranked suggestions 306 based on the user input and available data obtained from, for example, storage system 212. If the user input is matched to one or more code components, then the GUI 304 of the smart programming assistant displays the suggested completions for those code components in real time. Individual suggestions may be expanded in response to user input such that one or more of the following are displayed: a description 308 corresponding to the code component, one or more functions 310 corresponding to the code component, one or more constants 312 defined by the code components, and one or more code examples 314 related to the code component. The suggestions are ranked as described above with reference to FIG. 4, for example.

The arrangement of GUIs 300, 304 are merely examples, and those skilled in the art will appreciate that a number of other arrangements are possible. Additionally, it is to be appreciated that the GUI of the smart programming assistant 304 may be implemented in a variety of ways, such as a standalone application and/or a web application.

Figure 4:
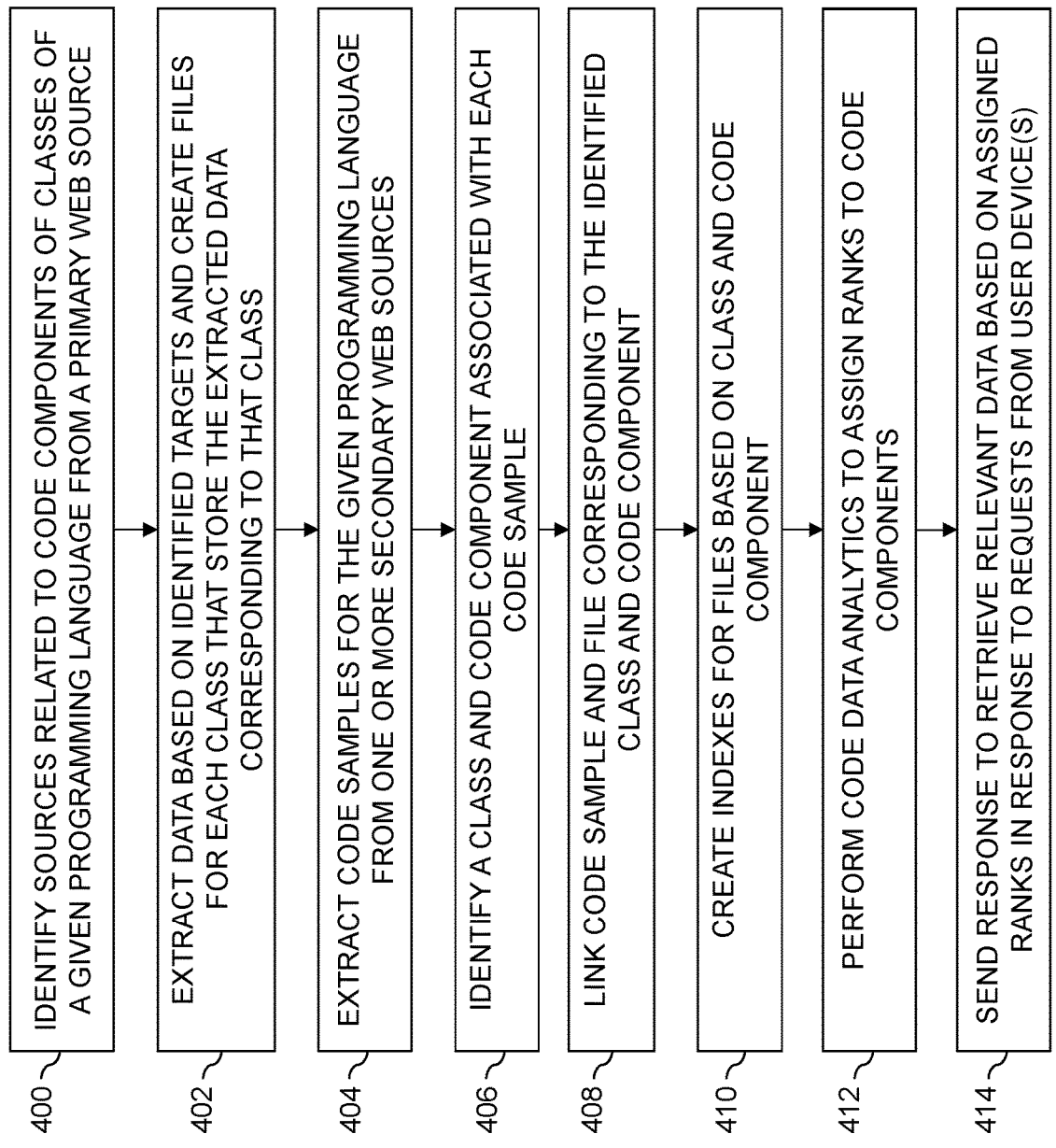
FIG. 4 is a flow diagram of an extraction and aggregation process in accordance with exemplary embodiments.

FIG. 4 shows a flow diagram of a process for providing a smart programming assistant in an illustrative embodiment of the invention. It is to be understood that this particular process is only an example, and additional or alternative processes can be carried out in other embodiments. In this embodiment, the process includes steps 400 through 414. These steps are assumed to be performed by the processor 120 utilizing its modules 130 and 132.

Step 400 includes identifying sources in a primary web source that are related to code components of classes of a given programming language. The primary web source may correspond to, for example, an official online code documentation source which defines, for example, language documentations, code samples, or any other relevant details pertaining to the programming language. Step 400 may be implemented based at least in part on a web crawler that traverses each page of the primary online source link-by-link given a starting input to a documentation page. The web crawler may identify targets (e.g., links) and store these targets in a tree type structure.

Step 402 includes extracting data from the identified targets. The extracted data is related to code components of the programming language (e.g., classes, functions, constants). A file is created for each class that includes the extracted data that is related to code components of that class. The output of step 402 may include a separate file for each class of the programming language that includes all key-value pairs for code components of that class (functions, constants, constructors, etc.).

Step 404 includes extracting code samples (or other relevant information) for the programming language from one or more secondary web sources. For example, the secondary sources may be external sources or internal sources.

Step 406 includes identifying a class and/or code component associated with each code sample. The code samples may be analyzed for the classes and functions that are used in the code sample.

At step 408, the code samples are linked to the file corresponding to the identified class/code component with an appropriate, descriptive key and the code sample as the value corresponding to the key.

Step 410 includes creating indexes for the files based on the corresponding class and code component (e.g., function).

Step 412 includes performing code data analytics on the data to assign ranks to each code component.

At step 414, relevant data is retrieved based on the assigned ranks in response to requests from one or more user devices.

Additionally, it is noted that the techniques described herein can easily be applied to any coding language such as pre-existing industry standards (e.g., Java and C#) or new programming languages (e.g., Scala, GoLang).

Figure 5:
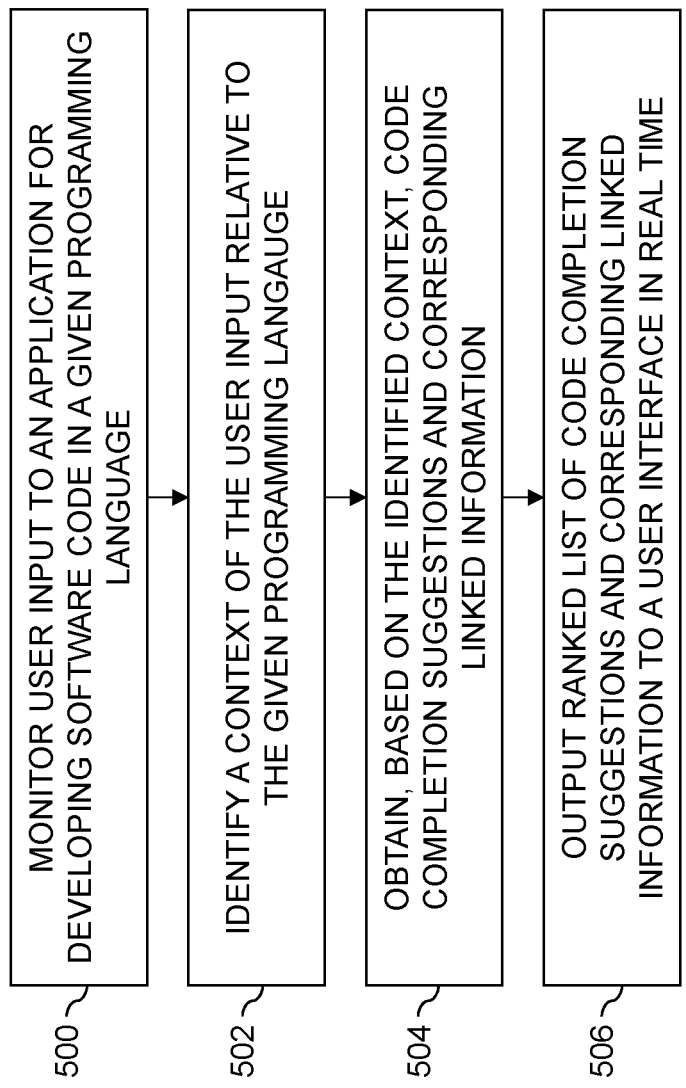
FIG. 5 is a flow diagram of a process for providing real time programming assistance in accordance with exemplary embodiments.

FIG. 5 shows a flow diagram of a process for providing a smart programming assistant in an illustrative embodiment of the invention. It is to be understood that this particular process is only an example, and additional or alternative processes can be carried out in other embodiments. In this embodiment, the process includes steps 500 through 506. These steps are assumed to be performed by the processor 180 utilizing its modules 190, 192, 194, and 196.

Step 500 includes monitoring user input that is being input to an application for developing software code in a given programing language. For example, the user input may correspond to a user editing a file in a given programming language using an IDE/code editor.

Step 502 includes identifying a context of the user input relative to the given programming language.

Step 504 includes obtaining, from a storage system, one or more candidate code completion suggestions that match the identified context, and information aggregated from a plurality of web sources that is linked to given one of the candidate code completion suggestions. The information includes programming language documentation information and one or more code samples, for example. Additionally, the programming language documentation information for a given one of the programming languages may be aggregated from an official online documentation web source associated with the given programming language, and the code samples may be aggregated from a web source that is different than the official online documentation web source. Code samples may be aggregated from at least one of a private code repository and a publicly available code sharing web source.

Step 506 includes outputting, in response to the user input, a ranked list of the one or more candidate code completion suggestions, and outputting at least a portion of the obtained information to a graphical user interface associated with the application in real time.

Step 500 may include capturing keystroke data when the application is an active window on a system of the user. Additionally, step 502 may include generating a data structure based on said captured keystroke data, and parsing said data structure to separate predefined code components of said one or more computer programming languages and custom code components. The predefined code components may include one or more of: a class, a function, a variable, a constant, and a constructor of at least one of the computer programming languages.

The one or more candidate code completion suggestions may correspond to predefined code components of said one or more programming languages, and may be obtained based on one or more data analytic algorithms that rank the relative importance of the predefined code components to the identified context. The data analytic algorithms may include a PageRank algorithm and a term frequency-inverse document frequency.

Each given one of the one or more code samples may be provided as input to a neural network to generate a score. The score may be indicative of a quality of the given code sample relative to one or more code quality metrics, such as one or more rules related to coding practices and one or more performance metrics, for example.

The one or more characteristics associated with said user may include at least one of: feedback provided by said user for one or more predefined code components of said one or more programming languages, and historical usage statistics of said user with one or more of the predefined code components.

Accordingly, the particular processing operations and other functionality described in conjunction with the flow diagrams of FIGS. 4 and 5 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide ranked code completions, context aware language documentations, and specific code samples from both internal and external sources in real time and without having to leave the IDE/code editor context. This is all done using a flexible architecture that is both language and IDE/code editor agnostic. These and other embodiments can effectively improve user interfaces for development tools by allowing the user not only to remain in the context of an IDE/code editor context, but also be presented with relevant information in real time. These and other embodiments can also reduce the time needed to teach new programmers code practices and technologies.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a content addressable storage system in illustrative embodiments. These and other cloud-based systems in illustrative embodiments can include object stores.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
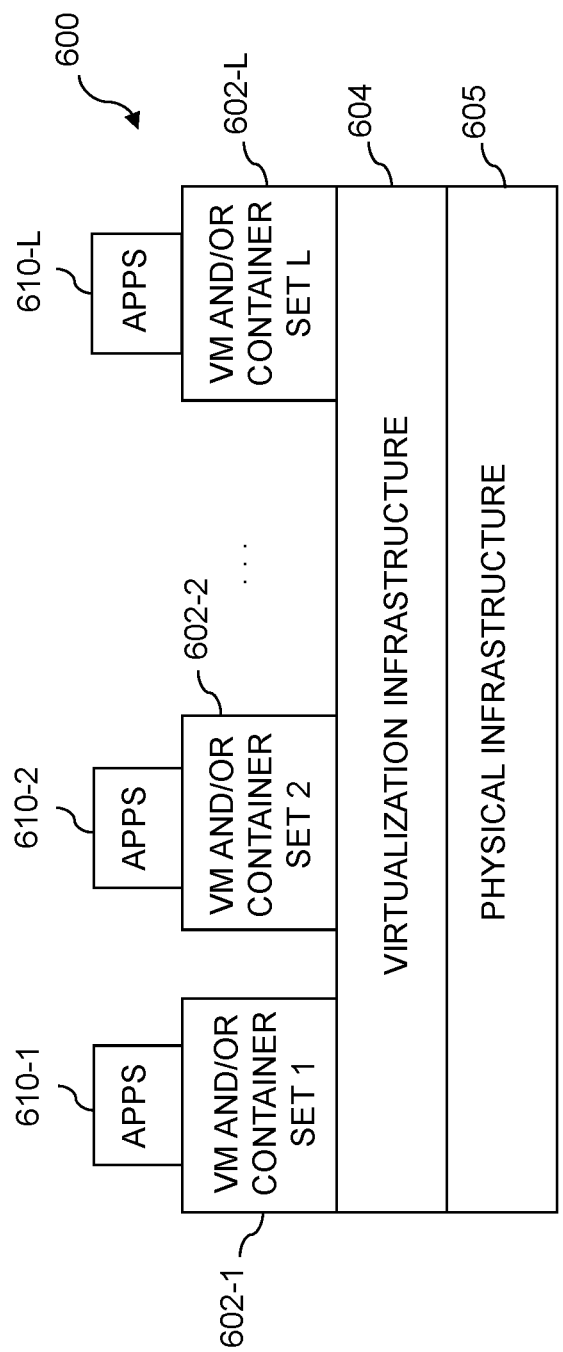
FIGS. 6 and 7 show examples of processing platforms that may be utilized to implement at least a portion of an information processing system in illustrative embodiments.
Figure 7:
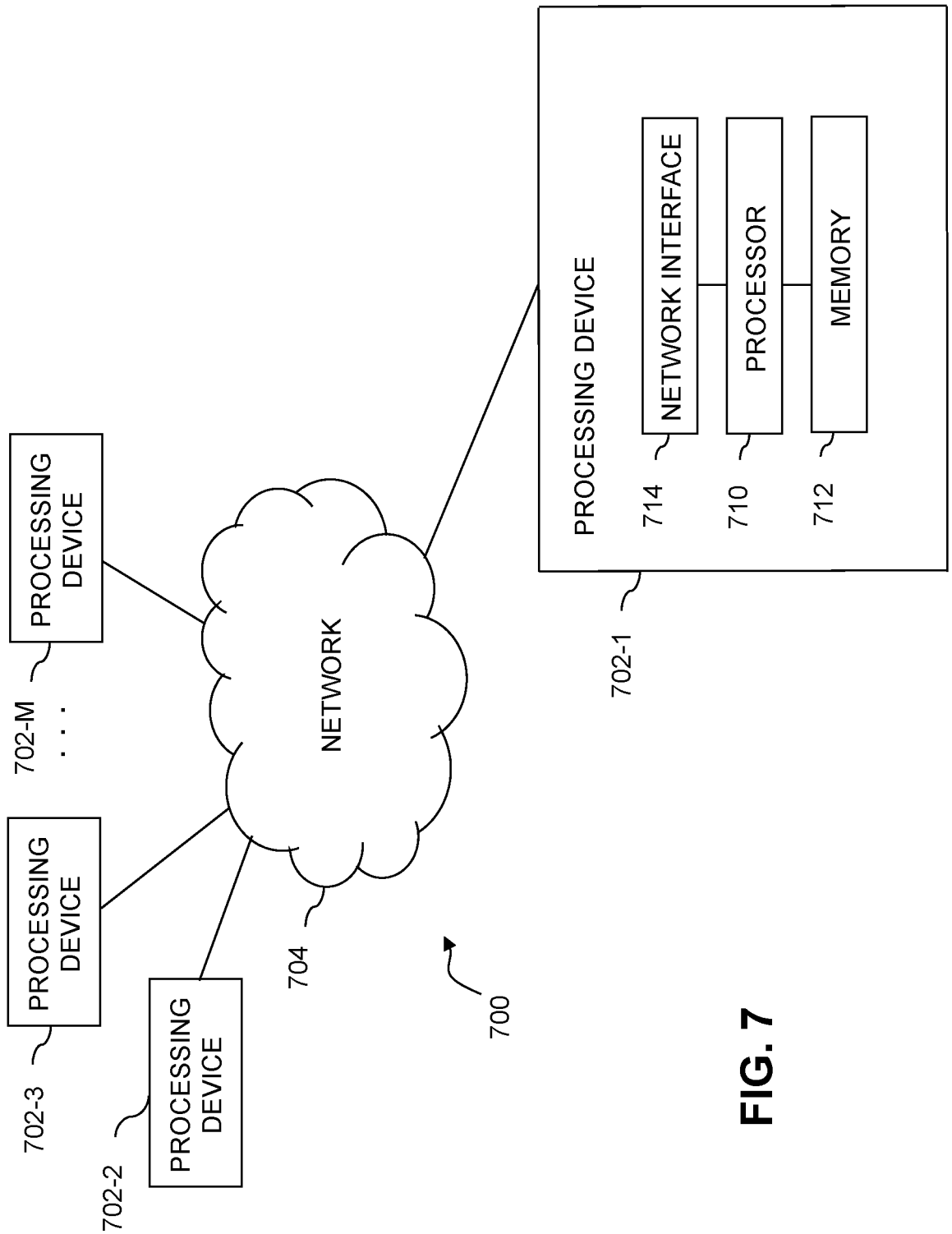

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-M, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include software-defined storage products, all-flash and hybrid flash storage arrays, cloud storage products, object-based storage products, scale-out all-flash storage arrays, and scale-out NAS clusters. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide secure authentication processes involving multiple user devices. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising steps of:
   identifying one or more processes corresponding to an application running on a system of a user;
   monitoring user input being provided to the application by the user, the user input associated with developing software code in one or more computer programming languages, wherein said monitoring comprises capturing keystroke data of the user in response to said identifying said one or more processes;
   identifying a context of said user input relative to said one or more computer programming languages;
   obtaining, from a storage system, (i) one or more candidate code completion suggestions that match the identified context, and (ii) information aggregated from a plurality of web sources that is linked to at least a given one of the candidate code completion suggestions, wherein the information comprises programming language documentation information and one or more code samples; and
   outputting, in response to said user input, a ranked list of said one or more candidate code completion suggestions and at least a portion of the obtained information to a graphical user interface in real time, wherein the order of the ranked list is based at least in part on one or more characteristics associated with said user;
   wherein the steps are performed by at least one processing device comprising a processor coupled to a memory.

2. The computer-implemented method of claim 1, wherein at least one of:
   the programming language documentation information for a given one of the programming languages is aggregated from an official online documentation web source associated with said given programming language; and
   the code samples for the given one of the programming languages are aggregated from a web source that is different than the official online documentation web source.

3. The computer-implemented method of claim 1, wherein the code samples are aggregated from at least one of a private code repository and a publicly available code sharing web source.

4. The computer-implemented method of claim 1, wherein said keystroke data is captured when the application is an active window on the system of the user, and wherein the graphical user interface corresponds to a different application than the application that the user input is being provided to.

5. The computer-implemented method of claim 1, wherein said identifying said context comprises generating a data structure based on said captured keystroke data, and parsing said data structure to separate predefined code components of said one or more computer programming languages and custom code components.

6. The computer-implemented method of claim 5, wherein the predefined code components comprise one or more of: a class, a function, a variable, a constant, and a constructor of at least one of said computer programming languages.

7. The computer-implemented method of claim 1, wherein said one or more candidate code completion suggestions correspond to predefined code components of said one or more programming languages, and wherein said one or more candidate code completion suggestions are obtained based on one or more data analytic algorithms that rank the relative importance of the predefined code components to the identified context.

8. The computer-implemented method of claim 7, wherein said one or more data analytic algorithms comprise a PageRank algorithm and a term frequency-inverse document frequency.

9. The computer-implemented method of claim 1, wherein each given one of the code samples is associated with a score that satisfies a predefined value, wherein the score is generated by a neural network model and is indicative of a quality of the given code sample relative to one or more code quality metrics.

10. The computer-implemented method of claim 9, wherein the one or more code quality metrics comprise: one or more rules related to coding practices and one or more performance metrics.

11. The method of claim 1, wherein said identifying said one or more processes is based on a type of the application, wherein the type of the application comprises one or more of: a code editor and an integrated development environment.

12. A non-transitory processor-readable storage medium having stored therein program code of one or more software programs, wherein the program code when executed by at least one processing device causes the at least one processing device:
   to identify one or more processes corresponding to an application running on a system of a user;
   to monitor user input being provided to the application by the user, the user input associated with developing software code in one or more computer programming languages, wherein said monitoring comprises capturing keystroke data of the user in response to said identifying said one or more processes;
   to identify a context of said user input relative to said one or more computer programming languages;
   to obtain, from a storage system, (i) one or more candidate code completion suggestions that match the identified context, and (ii) information aggregated from a plurality of web sources that is linked to at least a given one of the candidate code completion suggestions, wherein the information comprises programming language documentation information and one or more code samples; and
   to output, in response to said user input, a ranked list of said one or more candidate code completion suggestions and at least a portion of the obtained information to a graphical user interface in real time, wherein the order of the ranked list is based at least in part on one or more characteristics associated with said user.

13. The non-transitory processor-readable storage medium of claim 12, wherein at least one of:
   the programming language documentation information for a given one of the programming languages is aggregated from an official online documentation web source associated with said given programming language; and the code samples for the given one of the programming languages are aggregated from a web source that is different than the official online documentation web source.

14. The non-transitory processor-readable storage medium of claim 12, wherein the code samples are aggregated from at least one of a private code repository and a publicly available code sharing web source.

15. The non-transitory processor-readable storage medium of claim 12, wherein keystroke data is captured when the application is an active window on the system of the user, and wherein the graphical user interface corresponds to a different application than the application that the user input is being provided to.

16. The non-transitory processor-readable storage medium of claim 12, wherein said identifying said context comprises generating a data structure based on said captured keystroke data, and parsing said data structure to separate predefined code components of said one or more computer programming languages and custom code components.

17. An apparatus comprising:
at least one processing device comprising a processor coupled to a memory;
the at least one processing device being configured:
to identify one or more processes corresponding to an application running on a system of a user;
to monitor user input being provided to the application by the user, the user input associated with developing software code in one or more computer programming languages, wherein said monitoring comprises capturing keystroke data of the user in response to said identifying said one or more processes;
to identify a context of said user input relative to said one or more computer programming languages;
to obtain, from a storage system, (i) one or more candidate code completion suggestions that match the identified context, and (ii) information aggregated from a plurality of web sources that is linked to at least a given one of the candidate code completion suggestions, wherein the information comprises programming language documentation information and one or more code samples; and
to output, in response to said user input, a ranked list of said one or more candidate code completion suggestions and at least a portion of the obtained information to a graphical user interface in real time, wherein the order of the ranked list is based at least in part on one or more characteristics associated with said user.

18. The apparatus of claim 17, wherein said one or more candidate code completion suggestions correspond to predefined code components of said one or more programming languages, and wherein said one or more candidate code completion suggestions are obtained based on one or more data analytic algorithms that rank the relative importance of the predefined code components to the identified context.

19. The apparatus of claim 17, wherein each given one of the code samples is associated with a score that satisfies a predefined value, wherein the score is generated by a neural network model and is indicative of a quality of the given code sample relative to one or more code quality metrics.

20. The apparatus of claim 19, wherein the one or more code quality metrics comprise: one or more rules related to coding practices and one or more performance metrics.

\* \* \* \* \*

UNITED STATES PATENT AND TRADEMARK OFFICE
CERTIFICATE OF CORRECTION

PATENT NO. : 11,113,034 B2
APPLICATION NO. : 16/668922
DATED : September 7, 2021
INVENTOR(S) : Yash Kumar Singh et al.

Page 1 of 1

It is certified that error appears in the above-identified patent and that said Letters Patent is hereby corrected as shown below:

In the Claims

Column 16, Line 29, the portion of Claim 11 reading "The method of claim 1" should read --The computer-implemented method of claim 1--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*